US012700548B2

(12) United States Patent (10) Patent No.: US 12,700,548 B2
Tanimizu (45) Date of Patent: Aug. 4, 2026

(54) VACUUM CAPACITOR

(71) Applicant: MEIDENSHA CORPORATION, Tokyo (JP)

(72) Inventor: Yoshiyuki Tanimizu, Numazu (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 18/876,921

(22) PCT Filed: Jun. 16, 2023

(86) PCT No.: PCT/JP2023/022370
§ 371 (c)(1),
(2) Date: Dec. 19, 2024

(87) PCT Pub. No.: WO2023/248940
PCT Pub. Date: Nov. 28, 2023

(65) Prior Publication Data
US 2025/0273404 A1 Aug. 28, 2025

(30) Foreign Application Priority Data
Jun. 20, 2022 (JP) ................................. 2022-098537

(51) Int. Cl.
*H01G 5/014* (2006.01)
*H01G 5/16* (2006.01)
(52) U.S. Cl.
CPC .............. *H01G 5/014* (2013.01); *H01G 5/16* (2013.01)
(58) Field of Classification Search
CPC ....... H01G 2005/02; H01G 5/16; H01G 5/014
See application file for complete search history.

(56) References Cited

U.S. PATENT DOCUMENTS 3,257,590 A * 6/1966 Hansen .................... H01G 4/02
361/294
2010/0254066 A1* 10/2010 Takahashi ................ H01G 5/14
361/272
(Continued)

FOREIGN PATENT DOCUMENTS

CN 1387974 A 1/2003
CN 113597653 A 11/2021
(Continued)

OTHER PUBLICATIONS

CN Office Action for Application No. 202380048181.2 mailing date Jun. 28, 2025, 12 pages with English translation.
(Continued)

*Primary Examiner* — David M Sinclair
(74) *Attorney, Agent, or Firm* — Foley & Lardner LLP

(57) ABSTRACT
A brazing structure for a vacuum container is provided. The vacuum container includes: a fixed conductor on which a fixed electrode is supported; a movable conductor on which a movable electrode is supported; a flange pipe which is bonded to the movable conductor coaxially with the fixed electrode and the movable electrode; and a ceramic pipe which is provided coaxially therewith. One end of the ceramic pipe is bonded to the fixed conductor by brazing, with a linking flange pipe therebetween, and the other end thereof is bonded to the flange pipe by brazing, with a linking flange pipe therebetween. The linking flange pipe includes a bonding portion that is bonded to the ceramic pipe by active metal brazing using an AgCuTi-based, AgCuInTi-based, or AgCuSnTi-based metal.

4 Claims, 2 Drawing Sheets

(56)              References Cited

U.S. PATENT DOCUMENTS

2013/0286536 A1* 10/2013 Iyer ......................... H01G 4/35
                                                                361/302
2022/0044877 A1    2/2022 Bigler

FOREIGN PATENT DOCUMENTS

| JP | S46-040969 B1 | | 12/1971 |
|----|----|----|----|
| JP | S59-232692 A | | 12/1984 |
| JP | 05326324 A | * | 12/1993 |
| JP | 2006332388 A | * | 12/2006 |
| JP | 2007-116111 A | | 5/2007 |
| JP | 2009-252475 A | | 10/2009 |
| JP | 4692211 B2 | | 6/2011 |

OTHER PUBLICATIONS

Chinese Office Action issued in CN 202380048181.2 dated Mar. 28, 2026 with English translation (12 pgs).

* cited by examiner

VACUUM CAPACITOR

TECHNICAL FIELD

The present invention relates to a vacuum capacitor used for, for example, adjustment of impedance in a high frequency device such as a high frequency power source or a high power transmission circuit for a semiconductor facility.

BACKGROUND ART

Various vacuum capacitors have been conventionally used for adjustment of impedance in a high frequency device such as a high frequency power source or a high power transmission circuit for a general semiconductor facility.

FIG. 2 shows a schematic sectional view of a general vacuum capacitor (i.e., a vacuum variable capacitor) as an example. A vacuum container 1 of the vacuum capacitor includes a cylindrical body including a ceramic pipe 2, a flange pipe 3, and a flange pipe 4. The ceramic pipe 2 is an insulator made of 90 to 95% alumina, and includes a first and second ends metallized by nickel plating. The flange pipe 3 and the flange pipe 4 are respectively mounted to the first end and the second end of the ceramic pipe 2. The cylindrical body of the vacuum container 1 is sealed up by brazing a fixed conductor 5 and a movable conductor 6 respectively to a first end and a second end of the cylindrical body.

The metallizing employs the nickel plating for obtaining wettability of the brazing and thereby joining the ceramic pipe 2 with the fixed conductor 5 and the movable conductor 6. The wettability is based on a physical phenomenon depending on relations among a surface tension of a melted brazing material, a surface tension of the ceramic pipe 2, and an interfacial tension between the melted brazing material and the ceramic pipe 2.

PRIOR ART DOCUMENT(S)

Patent Document(s)

Patent Document 1: JP 4692211 B2

SUMMARY OF THE INVENTION

The conventional vacuum capacitor as described above undergoes rise in temperature, mainly because of heat generation in energized parts. This heat generation occurs also in a ceramic body and nickel plating coats of the ceramic pipe 2 made of 90 to 95% alumina and metallized by nickel plating. This has an impact especially due to increase in energized current, as described below.

Each of the nickel plating coats at the first and second ends of the ceramic pipe 2 metallized by nickel plating is a ferromagnet, and forms a ferromagnet magnetic passage having an annular shape, around an energization path of a high frequency current. This concentrates magnetic fluxes and generates a high magnetic flux density and a high frequency magnetic field, and thereby causes the annular ferromagnet magnetic passages made of nickel to generate heat due to hysteresis loss and eddy current loss, and raises metallized parts of the ceramic pipe 2 in temperature.

In case of exerting a high frequency voltage on the vacuum capacitor, the ceramic pipe 2 undergoes heat generation due to high frequency dielectric polarization. An amount of this heat generation per unit volume is proportional to: a square of an intensity of electric field; a frequency; a relative permittivity; and a dielectric tangent tan $\delta$.

The high frequency current in the vacuum capacitor can be increased by increasing the high frequency voltage exerted on the vacuum capacitor. For example, the high frequency voltage may be exerted 100% on the fixed conductor 5 and 0% on the movable conductor 6. In this situation, invisible equipotential lines each of which indicates a cross section of an equipotential surface can be defined, and be visualized as a 80% equipotential line 28, a 60% equipotential line 26, a 40% equipotential line 24, and a 20% equipotential line 22. The narrower a gap between two of the equipotential lines is, the higher the electric field intensity at the gap is.

In case of FIG. 2, the electric field intensity is biased to be highly concentrated in a vicinity of a brazing joint part between the ceramic pipe 2 and the flange pipe 3 and be low in the other parts. Such concentration of the electric field intensity on a particular part causes heat generation in the particular part, in proportion to the square of the electric field intensity there. Such case of the biased electric field intensity is greater than a case of dispersed electric field intensity, in total amount of heat generation due to the high frequency dielectric polarization in the ceramic pipe.

The amount of heat generation can be reduced by reducing the dielectric tangent tan $\delta$ by replacing the ceramic pipe 2 being made of 90 to 95% alumina and having a characteristic relative permittivity of 8.8 to 9.2 and a dielectric tangent tan $\delta$ of 0.0003 to 0.0004 with a high-purity ceramic pipe being made of 99.5 to 99.97% alumina and having a relative permittivity of 9.7 to 10.1 and a dielectric tangent tan $\delta$ of 0.0001. However, this reduction in heat generation is less in amount than increase in heat generation in case of high concentration of the electric field intensity on a particular part. This results in failure in reduction of the total amount of heat generation. Moreover, the increase in high frequency voltage further increases the total amount of heat generation in the ceramic pipe, and thereby further increases the rise in temperature. In case of dispersion of the electric field intensity, the high-purity ceramic pipe is less than the ceramic pipe 2 in total amount of heat generation in the ceramic pipe, because of a difference in characteristics therebetween.

Recently, high frequency devices gradually increase in load exerted on the high frequency devices, increase in required high frequency current flowing in the high frequency devices, and increase in size, while simultaneously increasing in high frequency voltage exerted on vacuum capacitors.

Originally, increase in size of energized parts are inevitable as a countermeasure for rise in temperature, because the rise in temperature is mainly caused by heat generation due to increase in energized current. In addition to this, as heat generation caused in parts other than the energized parts due to intensity of magnetic field and electric field, ceramic pipe 2 made of 90 to 95% alumina and metallized by nickel plating generates heat due to hysteresis loss and eddy current loss and high frequency dielectric polarization. This has an impact especially in case of increasing the energized current, because the energized current is increased by increasing the high frequency voltage exerted.

In view of the foregoing circumstances, it is desirable to reduce rise in temperature in energized parts of a vacuum capacitor and improve the vacuum capacitor in performance of energization of a high frequency current.

One aspect of the present invention is a brazing structure of a vacuum container containing a pair of electrodes, wherein the vacuum container includes: a first conductor supporting a first one of the pair of electrodes; a second conductor supporting a second one of the pair of electrodes; a flange pipe joined to the second conductor coaxially with the pair of electrodes; a ceramic pipe disposed coaxially with the pair of electrodes; and a connection flange pipe connecting the ceramic pipe to the first conductor or the flange pipe. The connection flange pipe includes a junction joined to the ceramic pipe by active metal brazing with use of an AgCuTi-based, AgCuInTi-based, or AgCuSnTi-based metal.

According to another aspect of the present invention, the brazing structure as described above is further configured such that: the first one of the pair of electrodes is a fixed electrode fixed to the first conductor; and the second one of the pair of electrodes is a movable conductor structured movable in a direction of an axis of the vacuum container.

According to still another aspect of the present invention, the brazing structure as described above is further configured such that the connection flange pipe includes a field-relaxing ring disposed on an outer side or an inner side of the junction.

According to still another aspect of the present invention, the brazing structure as described above is further configured such that the ceramic pipe is made of a ceramic composed of 99.5 to 99.97% alumina.

According to still another aspect of the present invention, a vacuum capacitor has the brazing structure as described above.

The above aspects of the present invention serves to reduce rise in temperature in energized parts of a vacuum capacitor and improve the vacuum capacitor in performance of energization of a high frequency current.

MODE(S) FOR CARRYING OUT THE INVENTION

Figure 1:
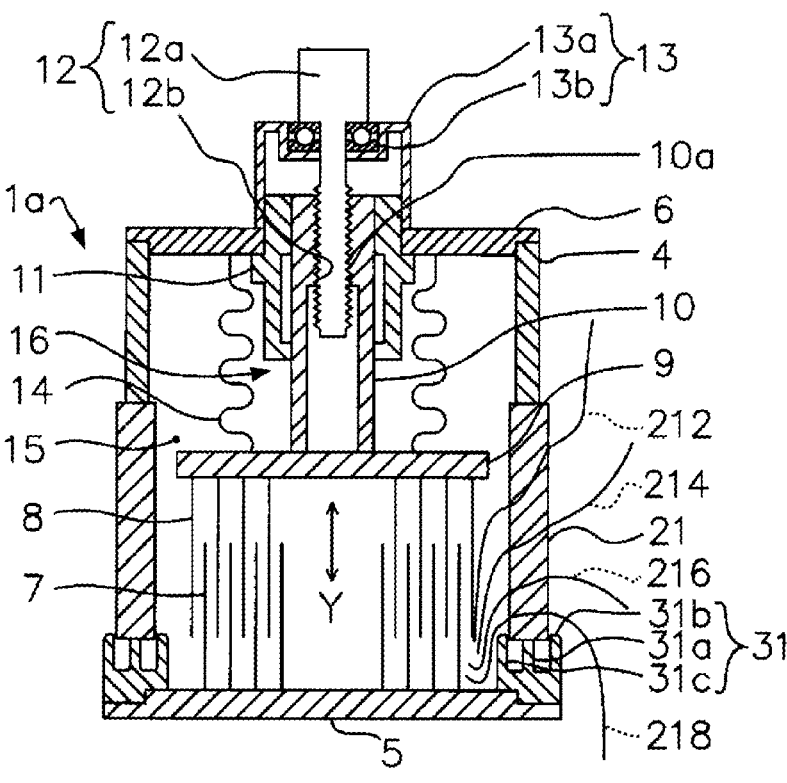
FIG. 1 is a sectional view showing structure of a vacuum capacitor according to an embodiment of the present invention.
Figure 2:
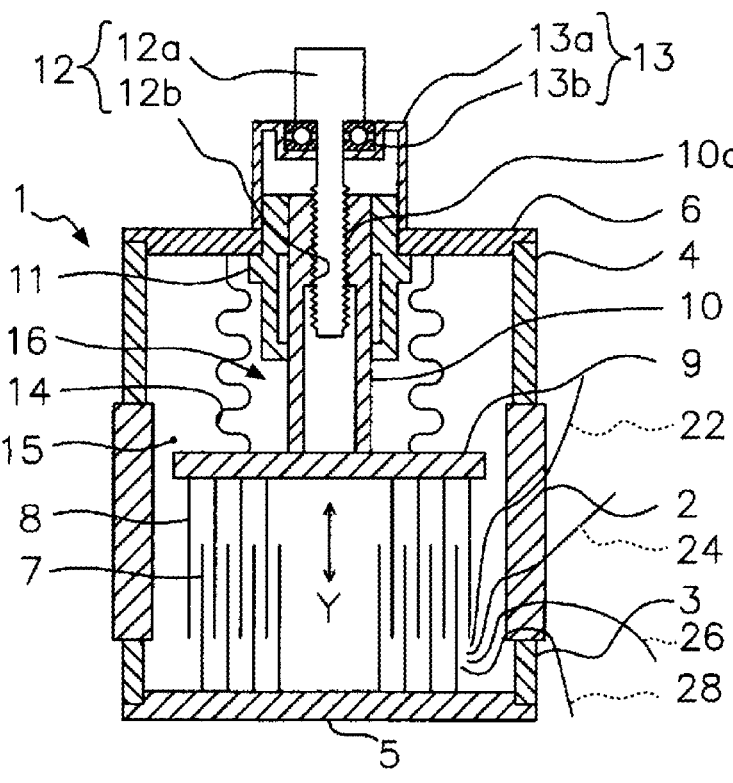
FIG. 2 is a sectional view showing structure of a vacuum capacitor according to a conventional art.

FIG. 1 shows a vacuum capacitor according to an embodiment of the present invention. The vacuum capacitor includes a vacuum container 1a. The vacuum container 1a includes a fixed conductor 5 (i.e., a first conductor), a movable conductor 6 (i.e., a second conductor), a fixed electrode 7, a movable electrode 8, a flange pipe 4, and a ceramic pipe 21. The fixed conductor 5 supports the fixed electrode 7. The movable conductor 6 supports the movable electrode 8. The flange pipe 4 is joined to the movable conductor 6, coaxially with the fixed electrode 7 and the movable electrode 8. The ceramic pipe 21 is disposed coaxially with the flange pipe 4.

The ceramic pipe 21 is made of a ceramic being an insulating high purity alumina, wherein 99.5 to 99.97% of the ceramic is composed of alumina. The ceramic pipe 21 includes a first end joined to the fixed conductor 5 via a connection flange pipe 31 by brazing. In addition, although omitted in the drawing, the ceramic pipe 21 includes a second end joined to the flange pipe 4 via a connection flange pipe 31 by brazing.

The connection flange pipe 31 includes a junction 31a that joins the ceramic pipe 21 to the fixed conductor 5 by active metal brazing.

The active metal brazing is performed with use of an active metal brazing material that readily wets and expands on a surface of the ceramic pipe 21 even in case that the surface of the ceramic pipe 21 is not metallized. For example, the active metal brazing material is a nonmagnetic or weak-paramagnetic metal such as an AgCuTi-based one, an AgCuInTi-based one, or an AgCuSnTi-based one.

The connection flange pipe 31 includes a field-relaxing ring disposed on an outer side or an inner side of the junction 31a. According to the embodiment of FIG. 1, the connection flange pipe 31 includes an atmosphere outer field-relaxing ring 31b and a vacuum inner field-relaxing ring 31c. The atmosphere outer field-relaxing ring 31b is disposed on the outer side of the junction 31a, i.e., an atmosphere outer side of the junction 31a. The vacuum inner field-relaxing ring 31c is disposed on the inner side of the junction 31a, i.e., a vacuum side of the junction 31a.

The fixed electrode 7 is fixed to an inner surface of the fixed conductor 5 inside the vacuum container 1a, and includes a plurality of electrodes that are substantially cylindrical thin plates, vary in diameter, and are coaxially arranged at constant intervals.

Similarly to the fixed electrode 7, the movable electrode 8 includes a plurality of electrodes that are substantially cylindrical thin plates, vary in diameter, and are coaxially arranged at constant intervals. The movable electrode 8 is structured to reciprocate in a direction Y of an axis of the vacuum container 1a, while facing the fixed electrode 7 so as not to contact with the fixed electrode 7. The movable electrode 8 is disposed on a movable supporter 9. The movable supporter 9 is made of copper, and is structured to adjust a degree of insertion of the movable electrode 8 in the fixed electrode 7 in the axial direction Y.

The movable supporter 9 includes a back surface, i.e., a surface opposite to the movable electrode 8, on which a movable rod 10 is disposed. The movable rod 10 is hollow, and extends to project from the movable conductor 6 in the axial direction Y of the vacuum container 1a, and is driven by the operation rod 12. The movable rod 10 is surrounded by a bellows 14 interposed between the movable conductor 6 and the movable supporter 9, and is supported by a bearing 11 of the movable conductor 6 coaxially with the flange pipe 4. The movable rod 10 has a gap between an outer peripheral surface of the movable rod 10 and the bearing 11, and is in sliding contact with the bearing 11 and thereby guided in the axial direction Y of the vacuum container 1a.

The operation rod 12 includes a first end including an external screw 12b and a second end including an operation rod head 12a. The external screw 12b is screwed in an internal screw 10a of the movable rod 10. The operation rod head 12a is linked to a drive source of the vacuum capacitor such as a motor. The operation rod 12 is supported by an operation rod supporter 13 so as to be rotatable.

The operation rod supporter 13 includes a screw retainer 13a and a thrust bearing 13b. The screw retainer 13a projects from the movable conductor 6 of the vacuum container 1a, covers the bearing 11, and is fixed to the movable conductor 6. The thrust bearing 13b reduces a torque for rotation of the operation rod 12.

The operation rod supporter 13 allows the movable rod 10 to be guided by the bearing 11 and move in the axial direction Y of the vacuum container 1a, in response to rotation of the operation rod 12 caused by the drive source such as a motor. This varies a facing area between the fixed electrode 7 and the movable electrode 8, and thereby achieves an arbitrary capacitance.

The bellows 14 has an accordion shape, is made of a copper alloy or a thin metal metallized by copper plating, and is extendable in the axial direction Y of the vacuum container 1a. The bellows 14 includes a first end joined to an inner wall of the movable conductor 6 and a second end joined to the movable supporter 9. Thus, the bellows 14 surrounds the movable rod 10, is disposed coaxially with the flange pipe 4, and establishes airtightness of a vacuum chamber 15 with the fixed electrode 7 and the movable electrode 8. On the other hand, the vacuum container 1a includes an atmosphere chamber 16 formed in a side of the movable rod 10 with respect to the bellows 14 and maintained at an atmospheric pressure.

The vacuum capacitor as described above is configured such that the rotation of the operation rod 12 caused by the drive source such as a motor moves the movable rod 10 in the axial direction of the vacuum container 1a, and then changes the facing area between the fixed electrode 7 and the movable electrode 8. This allows increase and decrease of a capacitance formed by the fixed electrode 7 and the movable electrode 8, and thereby allows arbitrary adjustment of impedance.

In response to exertion of the high frequency voltage on the vacuum container 1a, the high frequency current flows from the fixed conductor 5 to the fixed electrode 7, to the capacitance adjustable depending on a cross area between the fixed electrode 7 and the movable electrode 8 facing each other, and then to the movable supporter 9, the bellows 14, and the movable conductor 6. Thus, the vacuum container 1a is energized.

In case of exerting the high frequency voltage 100% on the fixed conductor 5 and 0% on the movable conductor 6, invisible equipotential lines is yielded, which are visualized in the drawing as a 80% equipotential line 218, a 60% equipotential line 216, a 40% equipotential line 214, and a 20% equipotential line 212.

The embodiment described above is configured to join the fixed conductor 5 and the ceramic pipe 21 via the connection flange pipe 31, by active metal brazing with use of the nonmagnetic or weak-paramagnetic metal such as an AgCuTi-based, AgCuInTi-based, or AgCuSnTi-based one. This makes the embodiment be less in hysteresis loss and eddy current loss than a case of conventional nickel plating with use of a ferromagnet.

The connection flange pipe 31 includes the field-relaxing ring(s) disposed on the outer side and/or the inner side of the junction 31a. This sets equipotential lines, especially the 80% equipotential line 218, apart from the brazing joint part, and relaxes and disperses the electric field intensity over an entire of the ceramic. This serves to reduce the total amount of heat generation in the energized parts of the vacuum capacitor, and lower the energized parts in temperature. The relaxing and dispersing of the electric field intensity occurs especially in parts of the ceramic pipe 2 likely to undergo high heat generation of the square of the electric field intensity, and reduces the total amount of heat generation in the ceramic pipe 2, and suppresses rise in temperature in the energized parts.

The active metal brazing material according to the present embodiment not only reduces the heat generation caused due to hysteresis loss and eddy current loss, but also is greater in wettability on the ceramic pipe 21 made of 99.5 to 99.97% alumina than on a ceramic pipe made of 90 to 95% alumina. This improves the brazing, and improves the vacuum container 1a in reliability of vacuum.

The configuration of the connection flange pipe 31 including both or one of the atmosphere outer field-relaxing ring 31b and the vacuum inner field-relaxing ring 31c is combined with the configuration of the ceramic pipe 21 having a high relative permittivity, and thereby presents a synergistic effect: greatly changing and dispersing the equipotential lines, and more dispersing the electric field intensity. This reduces an amount of heat generation caused due to high frequency dielectric polarization in the ceramic pipe 21, and further reduces the amount of heat generation, because of a low dielectric tangent tan δ. This reduces the amount of heat generation and suppresses the temperature rise, more greatly than a case of employing one of the above configurations alone.

The conventional countermeasure for temperature rise is mainly directed to heat generation due to increase in energized current, and inevitably leads to increase in size of energized parts. The vacuum capacitor according to the present embodiment reduces the total amount of heat generation by a countermeasure for temperature rise that is directed to the intensity of electric field and magnetic field in the ceramic pipe 2. This serves to improve the vacuum capacitor in performance of energization of high frequency current while avoiding increase in size.

Furthermore, the brazing structure according to the present invention is not limited to application to the vacuum variable capacitor of FIG. 1, but may be applied also to a vacuum fixed capacitor including a vacuum container containing a pair of electrodes.

The invention claimed is:

1. A vacuum capacitor having a brazing structure for a vacuum container containing a pair of electrodes, the vacuum capacitor comprising:
   the vacuum container including:
      a first conductor supporting a first one of the pair of electrodes;
      a second conductor supporting a second one of the pair of electrodes;
      a flange pipe joined to the second conductor coaxially with the pair of electrodes;
      a ceramic pipe disposed coaxially with the pair of electrodes, the ceramic pipe comprising a first end and a second end, the first end and the second being unmetallized; and
      a connection flange pipe connecting the ceramic pipe to the first conductor or the flange pipe,
   wherein the connection flange pipe includes:
      a junction joined to the unmetallized first end and the unmetallized second end of the ceramic pipe by active metal brazing with use of an AgCuTi-based, AgCuInTi-based, or AgCuSnTi-based metal; and
      a field-relaxing ring disposed on an outer side or an inner side of the junction.

2. The vacuum capacitor as claimed in claim 1, wherein:
   the first one of the pair of electrodes is a fixed electrode fixed to the first conductor; and
   the second one of the pair of electrodes is a movable electrode structured movable in a direction of an axis of the vacuum container.

3. The vacuum capacitor as claimed in claim 1, wherein the ceramic pipe is made of a ceramic composed of 99.5 to 99.97% alumina.

4. A vacuum capacitor having a brazing structure for a vacuum container containing a pair of electrodes, the vacuum capacitor comprising:
   the vacuum container including:

a first conductor supporting a first one of the pair of electrodes;

a second conductor supporting a second one of the pair of electrodes;

a flange pipe joined to the second conductor coaxially with the pair of electrodes;

a ceramic pipe disposed coaxially with the pair of electrodes; and a connection flange pipe connecting the ceramic pipe to the first conductor or the flange pipe, wherein the connection flange pipe includes:

a junction joined to the ceramic pipe by active metal brazing with use of an AgCuTi-based, AgCuInTi-based, or AgCuSnTi-based metal; and a field-relaxing ring disposed on an outer side or an inner side of the junction.

* * * * *